(12) United States Patent
Shih et al.

(10) Patent No.: US 9,030,424 B2
(45) Date of Patent: May 12, 2015

(54) METHOD AND ELECTRONIC DEVICE FOR VIRTUAL KEYBOARD WITH HAPTIC/TACTILE FEEDBACK

(75) Inventors: Yu-Liang Shih, Changhua County (TW); Jung-Wen Chang, Tao Yuan Shien (TW); Te-Chun Lee, Kaohsiung (TW)

(73) Assignee: Quanta Computer Inc., Tao Yuan Shien (TW)

( * ) Notice: Subject to any disclaimer, the term of this patent is extended or adjusted under 35 U.S.C. 154(b) by 352 days.

(21) Appl. No.: 13/418,910

(22) Filed: Mar. 13, 2012

(65) Prior Publication Data

US 2013/0088439 A1 Apr. 11, 2013

(30) Foreign Application Priority Data

Oct. 5, 2011 (TW) .............................. 100136174 A

(51) Int. Cl.
*G06F 3/041* (2006.01)
*G06F 3/0488* (2013.01)
*G06F 3/01* (2006.01)

(52) U.S. Cl.
CPC ............ *G06F 3/04886* (2013.01); *G06F 3/016* (2013.01); *G06F 2203/04104* (2013.01)

(58) Field of Classification Search
None
See application file for complete search history.

(56) References Cited

U.S. PATENT DOCUMENTS

| 2010/0020036 A1* | 1/2010 | Hui et al. ....................... 345/173 |
| 2010/0141590 A1 | 6/2010 | Markiewicz et al. |
| 2012/0166995 A1* | 6/2012 | McAleer ........................ 715/773 |
| 2012/0212422 A1* | 8/2012 | Fang .............................. 345/173 |
| 2013/0057475 A1* | 3/2013 | Duggan et al. ................ 345/168 |

FOREIGN PATENT DOCUMENTS

| TW | 200915152 A | 4/2009 |
| TW | 200928876 A | 7/2009 |
| TW | 201126381 A | 8/2011 |

OTHER PUBLICATIONS

Office Action issued by Taiwan Intellectual Property Office on Apr. 14, 2014.

* cited by examiner

*Primary Examiner* — Adam R Giesy
*Assistant Examiner* — Henok Heyi
(74) *Attorney, Agent, or Firm* — Rabin & Berdo, P.C.

(57) ABSTRACT

A method for a virtual keyboard is provided. A touch panel is controlled to detect multiple finger touch points. In response to the finger touch points, a display panel is controlled to display the virtual keyboard, wherein shape and size of the virtual keyboard are determined according to at least coordinates and touch areas of the finger touch points. A haptic/tactile actuator is controlled to generate haptic/tactile feedback to express a border around each key of the virtual keyboard. The haptic/tactile actuator is controlled to generate haptic/tactile feedback in response to a press upon a key of the virtual keyboard.

16 Claims, 8 Drawing Sheets

METHOD AND ELECTRONIC DEVICE FOR VIRTUAL KEYBOARD WITH HAPTIC/TACTILE FEEDBACK

This application claims the benefit of Taiwan application Serial No. 100136174, filed Oct. 5, 2011, the subject matter of which is incorporated herein by reference.

1. Technical Field

The invention relates in general to a method and an electronic device providing a virtual keyboard, and more particularly to a method and an electronic device providing a virtual keyboard with haptic/tactile feedback.

2. Background

Accompanied with overwhelming advancement in touch sensing techniques, conventional non-touch screens and physical keyboards in many electronic devices are gradually replaced by touch displays, which are capable of serving as both a display screen and a user input interface. Based on such touch sensing techniques, a virtual keyboard, also referred to as a software input panel (SIP), is developed for allowing a user to input texts and symbols through a touch display into an electronic device.

A virtual keyboard is however compromised by certain utilization convenience issues. For example, sizes of hands, positions of fingers placed on a display, and typing habits may be quite different, such that keyboard sizes suitable for hands of men, women, children and adults may vary too. As a result, utilization inconveniences are caused from manipulating a virtual keyboard in an inappropriate size to even increase risks of hand injuries.

Further, being different from a physical keyboard, when a user presses a key of a virtual keyboard, a fingertip is less sensible to feedback from the pressed key, such that it is possible that a user is not completely certain whether the key is correctly pressed or may even be unaware of the number of times of actual contacts. Therefore, manipulations on a virtual keyboard through only touch typing inevitably encounter certain difficulties, and a user may further rely on visual feedback provided by the touch display to obtain an outcome of the touch. Yet, such approach not only imposes visual loading on the user but also depreciates operation conveniences of an electronic device.

SUMMARY OF THE INVENTION

The invention is directed to a method and an electronic device for providing a virtual keyboard to enhance operation conveniences of the electronic device through an adaptive virtual keyboard with haptic/tactile feedback.

According to an example the present invention, a method for providing a virtual keyboard is provided. A touch panel is controlled to detect multiple finger touch points. In response to the finger touch points, a display panel is controlled to display the virtual keyboard, wherein shape and size of the virtual keyboard are determined according to at least coordinates and touch areas of the finger touch points. A haptic/tactile actuator is controlled to generate haptic/tactile feedback to express a border around each key of the virtual keyboard. The haptic/tactile actuator is controlled to generate haptic/tactile feedback in response to a press upon a key of the virtual keyboard.

According to another example of the present invention, an electronic device for haptic/virtual feedback is provided. The electronic device includes a processing module, a display panel, a touch panel, and a haptic/tactile actuator. The display panel is coupled to the processing module. The touch panel is coupled to the processing module, and is also coupled to the display panel to form a touch display. The haptic/tactile actuator is coupled to the processing module. The processing module controls the touch panel to detect multiple finger touch points. In response to the finger touch points, the processing module controls the display panel to display a virtual keyboard, wherein shape and size of the virtual keyboard are determined according to at least coordinates and touch areas of the finger touch points. The processing module controls the haptic/tactile actuator to generate haptic/tactile feedback to express a border around each key of the virtual keyboard. The processing module controls the haptic/tactile actuator to generate haptic/tactile feedback in response to a press upon a key of the virtual keyboard.

It is to be understood that both the foregoing general description and the following detailed description are exemplary and explanatory only and are not restrictive of the disclosed embodiments, as claimed.

DETAILED DESCRIPTION OF THE INVENTION

A method and an electronic device for providing a virtual keyboard shall be disclosed below. In some embodiments, a shape and a size of the virtual keyboard are determined according to coordinates and areas of finger touch points to provide an adaptive virtual keyboard, and haptic/tactile feedback of the virtual keyboard is enhanced by a haptic/tactile actuator to optimize operation conveniences of the electronic device.

Figure 1:
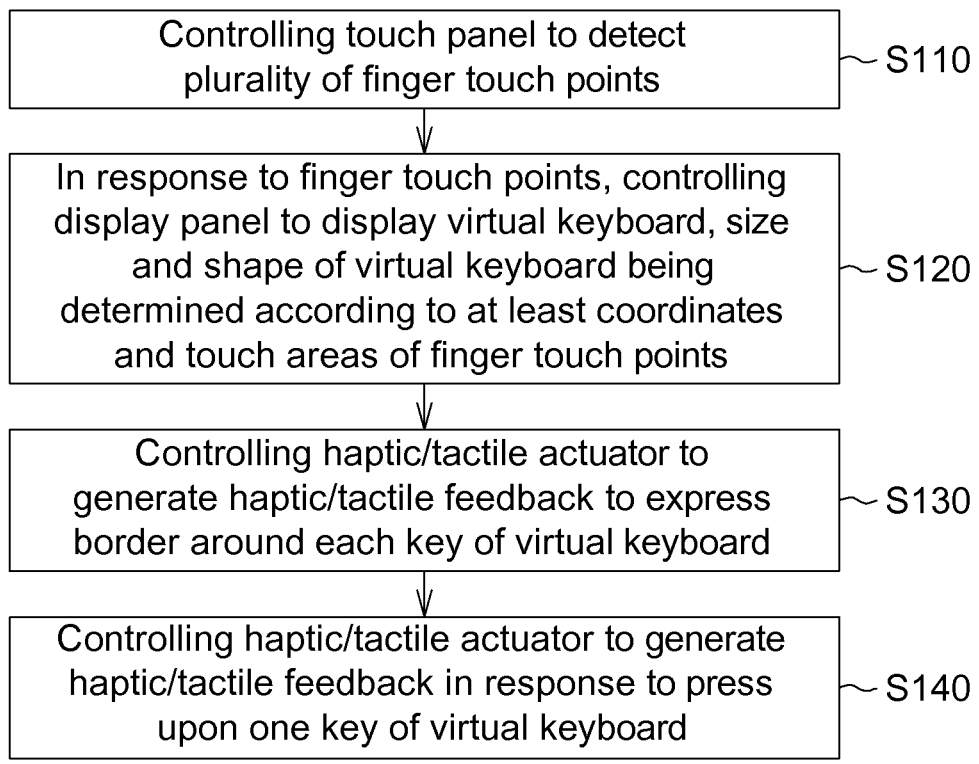
FIG. 1 is a flowchart of a method for providing a virtual keyboard according to an embodiment of the present invention.

FIG. 1 shows a flowchart of a method for providing a virtual keyboard according to an embodiment of the present invention. In Step S110, a touch panel is controlled to detect a plurality of finger touch points. In Step S120, in response to the finger touch points, a display panel is controlled to display a virtual keyboard, whose shape and size are determined according to at least coordinates and touch areas of the finger touch points. In Step S130, a haptic/tactile actuator is controlled to generate haptic/tactile feedback to express a border around each key of the virtual keyboard. In Step S140, the haptic/tactile actuator is controlled to generate haptic/tactile feedback in response to a press upon a key of the virtual keyboard.

The introduction of the coordinates and areas of the finger touch points provides an adaptive virtual keyboard, so that the size and shape of the virtual keyboard match distances between fingers, sizes of fingertips and/or typing gestures. By providing the haptic/tactile feedback, a user feels borders of the keys of the virtual keyboard as well as the sense of punching the keys at a surface of the touch panel to express a sense of operating a physical keyboard, thereby optimizing operation conveniences of the electronic device. Further, the haptic/tactile feedback also reduces visual reliance for a user to enhance user experiences.

Figure 2:
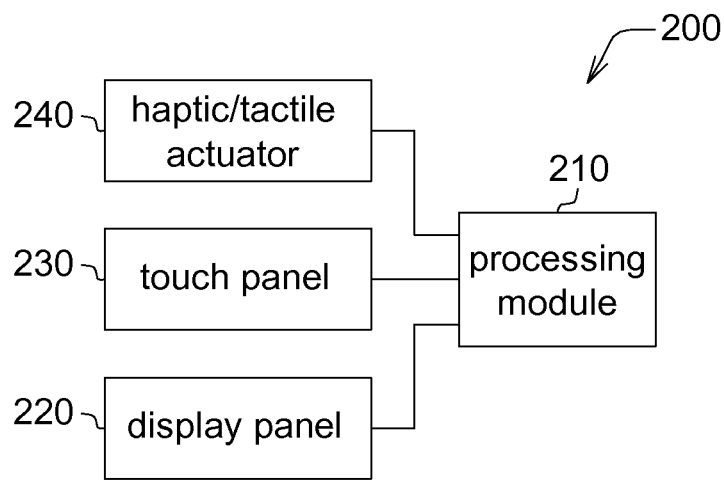
FIG. 2 is a block diagram of an electronic device according to an embodiment of the present invention.

FIG. 2 shows a block diagram of an electronic device according to an embodiment of the present invention. For example, an electronic device 200 is a tablet computer, a notebook computer, a handheld device, a smart phone, or an equivalent device. In this embodiment, the electronic device 200 includes a processing module 210, a display panel 220, a touch panel 230, and a haptic/tactile actuator 240.

The processing module 210 performs various computation procedures, and has a micro processing chip or other processor with computation capabilities. The processing module 210, operatively coupled to the display panel 220, the touch panel 230 and the haptic/tactile actuator 240, detects a touch on the touch panel 230 and correspondingly controls information displayed on the display panel 220 to provide visual feedback. The processing module 210 further detects a touch on the touch panel 230 to correspondingly drive the haptic/tactile actuator 240 to generate haptic/tactile feedback.

The display panel 220 displays various types of information. For example, the display panel 220 is an electronic paper (ePaper) display panel, an electrophoretic ink (E-Ink) display panel, a light-emitting diode (LED) liquid crystal display panel, an organic light-emitting diode (OLED) display panel, or an active matrix organic light-emitting diode (AMOLED) display panel. In some embodiments, the display panel 220 may also be integrated with the touch panel 230 to form a super AMOLED display panel. It should be noted that the display panel 220 is not limited to the examples above, but can be other equivalent devices offering visual feedback.

For example, the touch panel 230 is a resistive, capacitive, optic or ultrasonic touch panel, or other types of touch panel. A touch region of the touch panel 230 corresponds to a display region of the display panel 220 to realize visual feedback. For example, the touch panel 230 is covered on the display panel 220 or is embedded into the display panel 220. The touch panel 230 is further coupled to the display panel 220 to form a touch display.

The actuator 240 generates haptic/tactile feedback. For example, the haptic/tactile actuator 240 is based on a piezoelectric vibrator, a vibrating motor, a heat-generating actuator, or an eccentric rotating mass (ERM) actuator, to generate vibration feedback, vibrotactile feedback, or heat feedback. It should be noted that other types of haptic/tactile feedback may be rendered according to a haptic/tactile actuator in different forms. In practice, haptic/tactile feedback provided by the haptic/tactile actuator 240 may be utilized for simulating the feel of grains of a texture of different levels, e.g., a fine to coarse texture, or a sharp to smooth texture.

Figure 3:
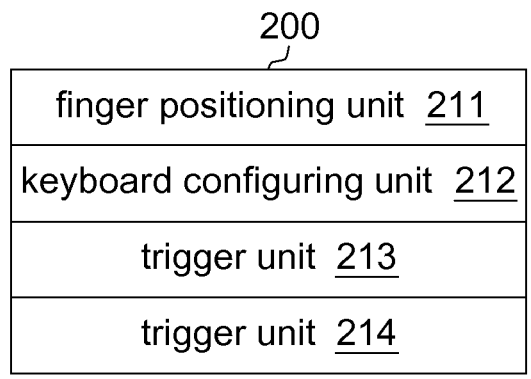
FIG. 3 is a functional block diagram of the electronic device in FIG. 2 according to an embodiment of the present invention.

FIG. 3 shows a functional block diagram of an example of the processing module of the electronic device in FIG. 2. In this example, the processing module 210 includes a finger positioning unit 211, a keyboard configuring unit 212, and two trigger units 213 and 214. For example, the units 211 to 214 may be realized by software programs, hardware circuits or firmware functioning with drivers.

Referring to FIG. 3, when a user touches a touch sensing surface of the touch panel 230 with one or more fingers (for example index fingers, middle fingers, ring fingers and little fingers (further including or excluding thumbs)) of left hand and/or right hand, the finger positioning unit 211 positions the finger touch points to obtain coordinates and touch areas of the finger touch points.

Figure 4:
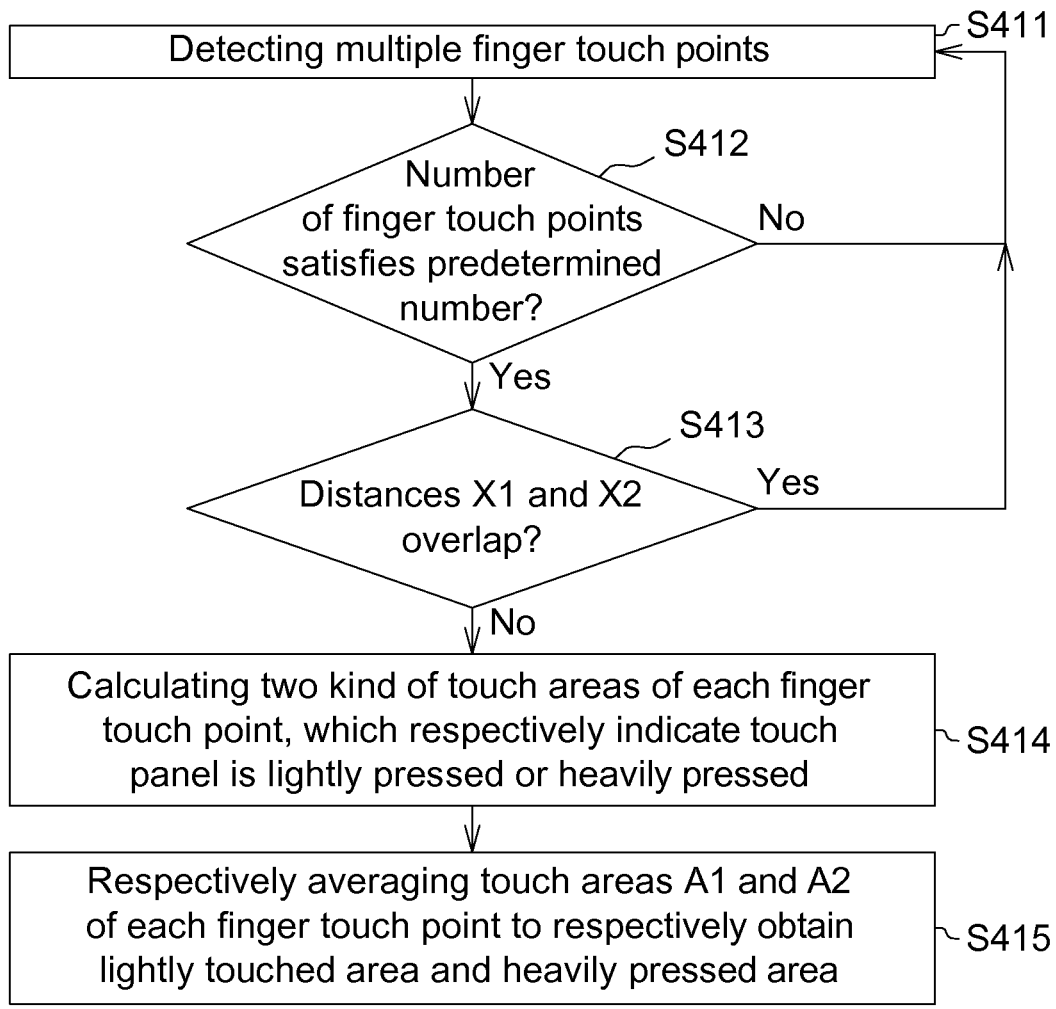
FIG. 4 is a flowchart of an example of configuring a virtual keyboard.

Functions of the finger positioning unit 211 shall be described below in detail with reference to FIGS. 4, and 5A to 5D. FIG. 4 shows a flowchart of an example of configuring a virtual keyboard. FIGS. 5A to 5D show schematic diagrams of an example of configuring a virtual keyboard.

Figure 5A:
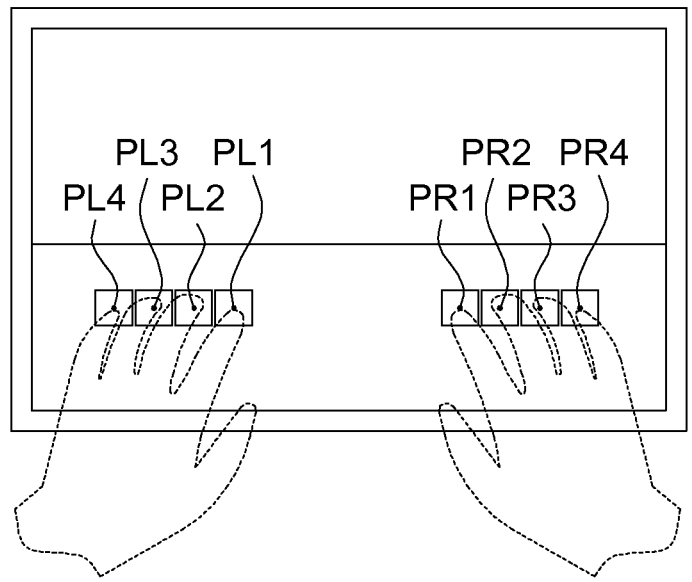
FIGS. 5A to 5D are schematic diagrams of an example of configuring a virtual keyboard.
Figure 5B:
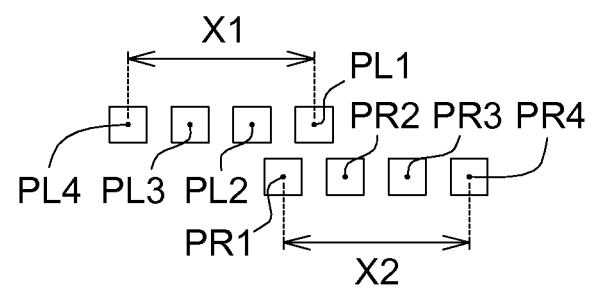

In Step S411, the processing module 210 controls the touch panel 230 to detect the multiple finger touch points. For example, as shown in FIG. 5A, on the touch panel 230 are eight touch points PL1 to PL4 and PR1 to PR4 respectively resulted by the index fingers, the middle fingers, the ring fingers and the little fingers of left hand and right hand.

In Step S412, the processing module 210 determines whether the number of the finger touch points satisfies a predetermined number. For example, as shown in FIG. 5A, it implies that gestures of a user are not correct keyboard typing gestures if the processing module 210 determines the number of the finger touch points is less than eight, and so Step S411 is iterated to detect finger touch points. Alternatively, Step S413 is performed if the processing module 210 determines the number of the finger touch points equals eight. Further, the processing module 210 determines the number of the finger touch points is greater than eight, it means that the detected touch points may contain one or more undesired touch points resulted by the thumb or other unintended touch points. At this point, the undesired touch point(s) is/are removed and Step S413 is performed.

Figure 5C:
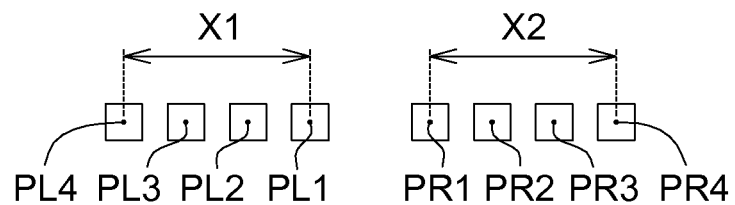

In Step S413, the processing module 210 determines whether a first distance between a left index finger touch point and a left little finger touch point overlaps a second distance between a right index finger touch point and a right little finger touch point. For example, referring to FIG. 5B, between the left index finger touch point PL1 and the left little finger touch point PL4 is a distance X1; between the right index finger touch point PR1 and the right little finger touch point PR4 is a distance X2. An overlap between the distances X1 and X2 indicates that the two hands of the user are overlapped rather than being set in correct keyboard typing gestures, and so Step S411 is iterated to detect finger touch points. In contrast, as shown in FIG. 5C, if the distances X1 and X2 are not overlapped, Step S414 is performed.

Figure 5D:
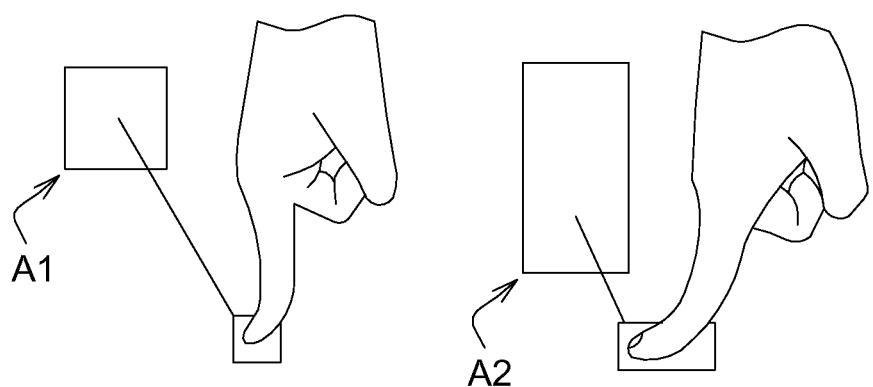

In Step S414, the processing module 210 calculates a first touch area of each of the finger touch points, with the first touch area for indicating that the touch panel 230 is lightly pressed, and a second touch area of each of the finger touch points, with the second touch area for indicating that the touch panel 230 is heavily pressed. For example, the processing module 210 instructs the user through the screen to lightly press the screen. At this point, as shown in FIG. 5C, the processing module 210 calculates a touch area A1 of one of the finger touch points to represent that the touch panel 230 is lightly pressed. The processing module 210 further instructs the user through the screen to heavily press the screen. At this point, as shown in FIG. 5D, the processing module 210 calculates a touch area A2 of one of the finger touch points to represent that the touch panel 230 is heavily pressed. A width and a breadth of the touch areas A1 and A2 may be represented in a unit of pixels. Due to the fact that a contact area between the touch panel 230 and a fingertip increases as the touch panel 230 is heavily pressed, the touch area A2 is greater than the touch area A1.

In Step S415, the processing module 210 respectively averages the touch areas A1 and A2 of the finger touch points PL1 to PL4 and PR1 to PR4 to respectively obtain a lightly pressed area and a heavily pressed area resulted by user fingers. In this exemplary embodiment, for example, the average value of the touch areas A1 of the finger touch points PL1 to PL4 and PR1 to PR4 is 50*50 pixels, and the average value of the touch areas A2 of the finger touch points PL1 to PL4 and PR1 to PR4 is 50*100 pixels.

Again referring to FIG. 3, the keyboard configuring unit 212 is for computing an adaptive size of a unit key of a keyboard for a user according to the coordinates and touch areas of the finger touch points, and to further extending to keys and key positions on the keyboard based on the unit key.

Figure 6:
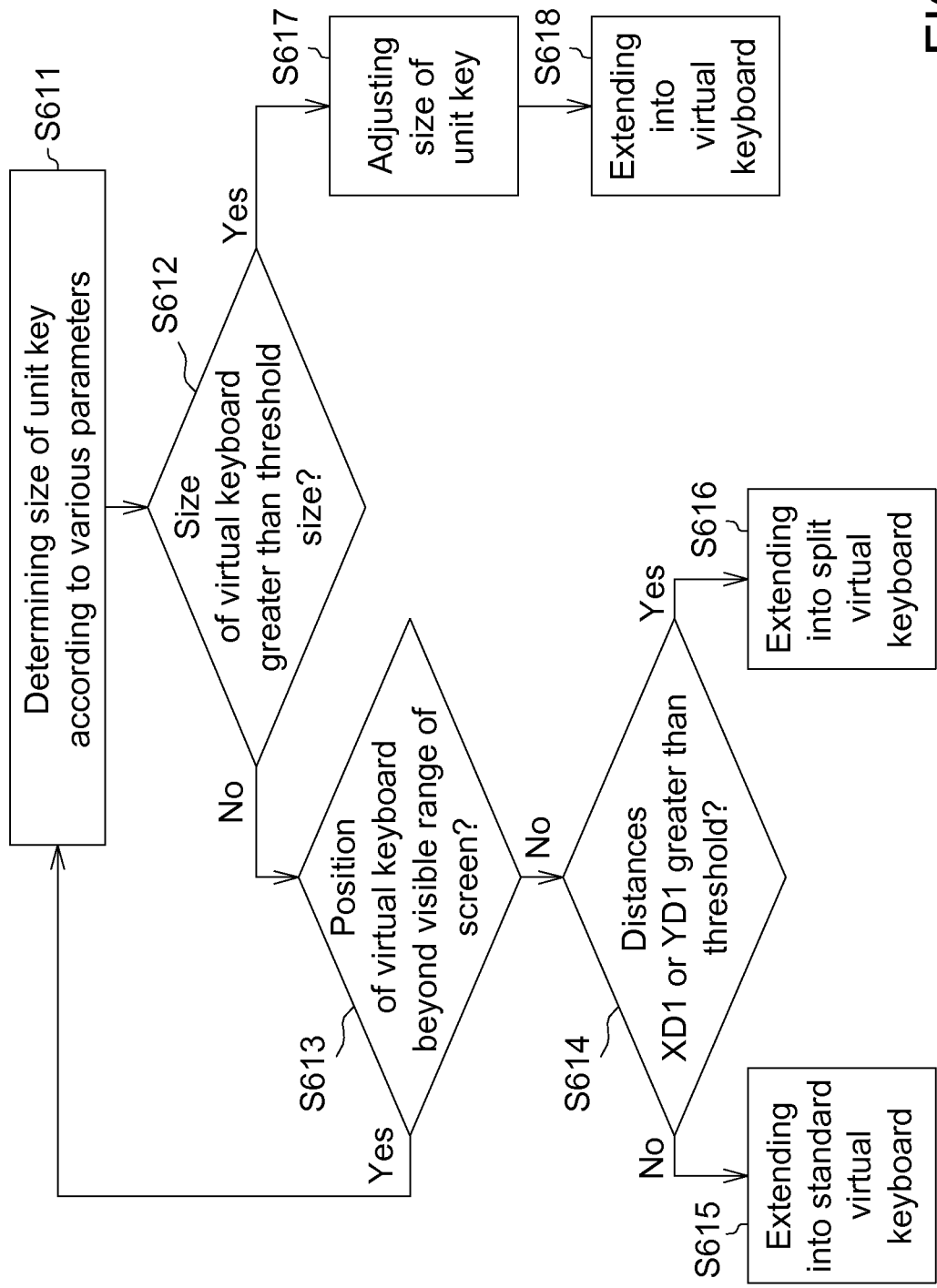
FIG. 6 is a flowchart of another example of configuring a virtual keyboard.

Functions of the keyboard configuring unit 212 shall be described in detail below with reference to FIGS. 6 and 7A to 7E. FIG. 6 shows a flowchart of an example of configuring a virtual keyboard. FIGS. 7A to 7E show schematic diagrams of an example of configuring a virtual keyboard.

Figure 7A:
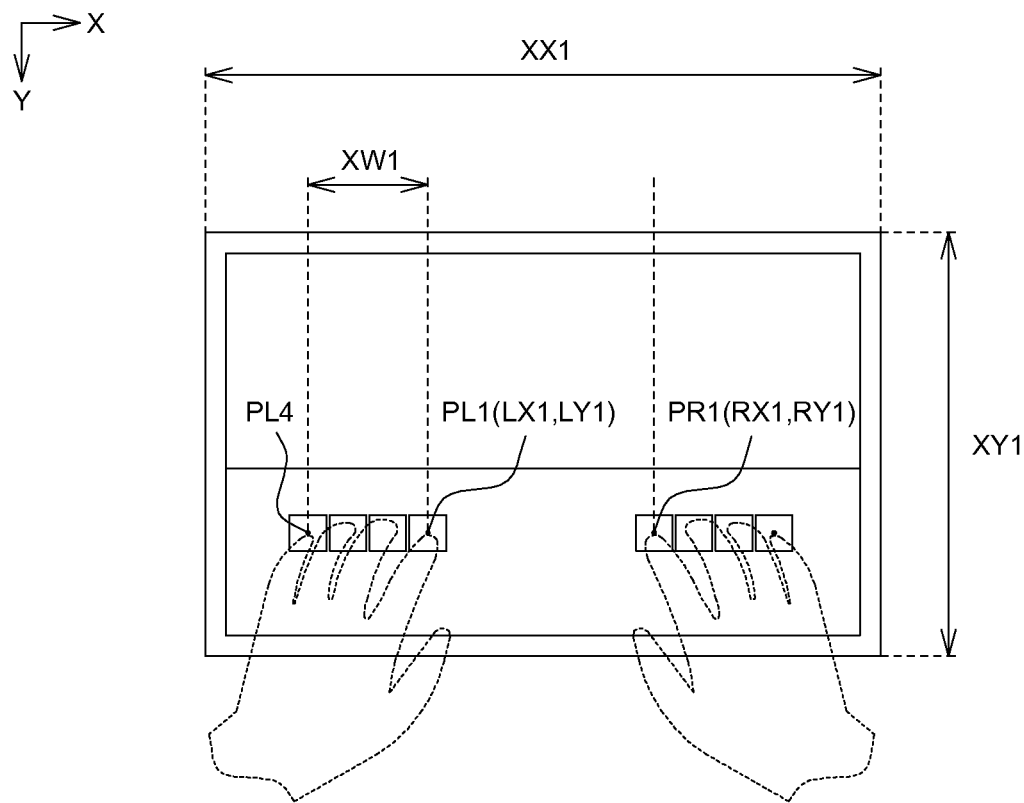
FIGS. 7A to 7E are schematic diagrams of an example of configuring a virtual keyboard.
Figure 7B:
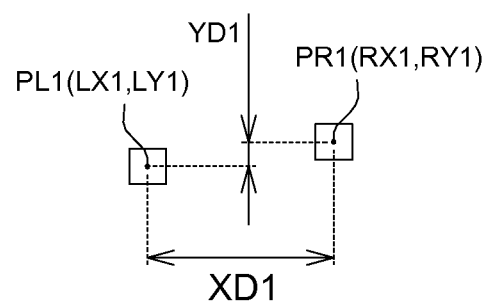

In Step S611, the processing module 210 determines the size of the unit key according to parameters associated with the size and shape of a virtual keyboard. For example, assume the size of the unit key is XW2*XH2. As shown in FIG. 7A, a X distance between the left index finger touch point PL1 and the left little finger touch point PL4 is XW1. The average value of the touch area (e.g., the above touch area A2) of the finger touch points is AW*AH pixels (e.g., 50*100 pixels), wherein AH represents an average height of the touch area. The coordinate of the left index finger touch point PL1 is (LX1, LY1), and the coordinate of the right index finger touch point PR1 is (RX1, RY1). A screen (the display 220 or the touch panel 230) has a width of XX1 and a height of XY1. In this example, the size of the unit key may be XW2=XW1/4, and XH2=AH.

In Step S612, the processing module 210 determines whether the size of the virtual keyboard is greater than a threshold size based on the size of the unit key. For example, assume the virtual keyboard is a QWERTY keyboard with 12*4 unit keys. If the screen width XX1 is greater than 12*XW2, it means the width of the virtual keyboard is smaller than a threshold width. Further, if the screen height XY1 is greater than 4*XH2, it means the height of the virtual keyboard is smaller than a threshold height.

Step S613 is performed if it is determined the size of the virtual keyboard is smaller than the threshold size; and Step S617 is performed if it is determined the size of the virtual keyboard is greater than threshold size.

In Step S613, the processing module 210 determines whether the position of the virtual keyboard exceeds a visible range of the screen based on the coordinates of the left index finger touch point and the right index finger touch point. For example, as shown in FIG. 7A, considering the left index finger touch point PL1, its coordinate (LX1, LY1) is for positioning an "F" key. In a QWERTY keyboard, a half of the width of the keyboard is about a total width of six keys, and a half of the height of the keyboard is about a total height of four keys. Therefore, to prevent the position of the virtual keyboard from exceeding beyond the visible range of the screen, it is determined whether the coordinate (LX1, LY1) of the left index finger touch point PL1 satisfies:

$(LX1+XW2) \geq 6*XW2;$ $(XY1-LY1) \geq 4*XH2.$

Similarly, to prevent the position of the virtual keyboard from exceeding the visible range of the screen, it is determined whether the coordinate (RX1, RY1) of the right index finger touch point PR1 satisfies:

$(XX1-RX1+XW2) \geq 6*XW2;$ $(XY1-RY1) \geq 4*XH2.$

Step S611 is iterated if it is determined that the position of the virtual keyboard exceeds the visible range of the screen; or else Step S614 is performed if it is determined that the position of the virtual keyboard does not exceed the visible range of the screen.

In Step S614, the processing module 210 determines whether a distance between the left index finger touch point and the right finger touch point is greater than a threshold. For example, referring to FIG. 7B, the processing module 210 determines whether an X (horizontal) distance XD1 between the left index finger touch point PL1 and the right index finger touch point PR1 is greater than the width of one unit key. The processing module 210 further determines whether a Y (vertical) distance YD1 between the left index finger touch point PL1 and the right index finger touch point PR1 is greater than the height of one unit key. Step S615 is performed if both determination results for the distances XD1 and YD1 are No; and Step S616 is performed if at least one of the two determination results for the distances XD1 and YD1 is yes.

Figure 7C:
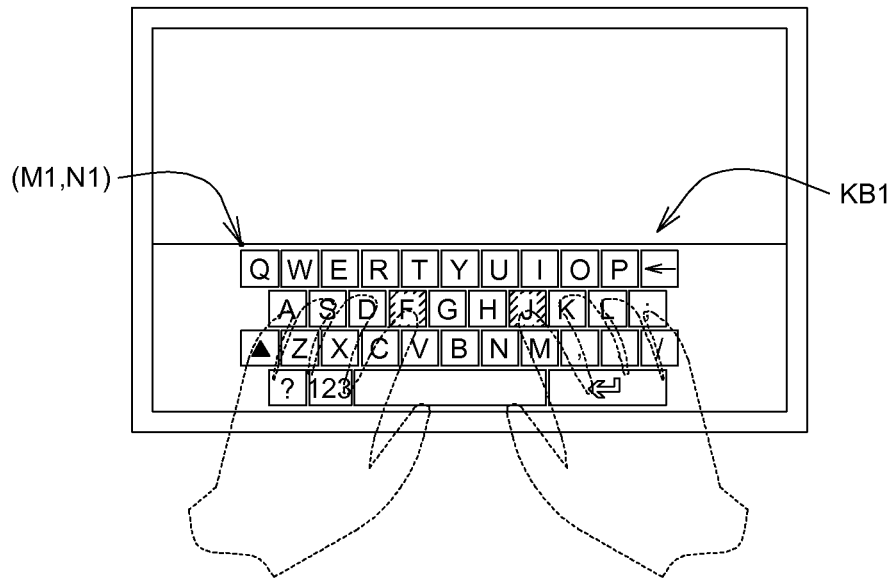

In Step S615, the processing module 210 extends to a standard virtual keyboard based on the size of the unit key. The standard virtual keyboard here refers to a virtual standard keyboard with keys equidistantly spaced from a center. For example, as shown in FIG. 7C, a standard keyboard KB1 is extended from the center. In other words, the standard virtual keyboard KB1 is horizontally extended from an X coordinate M1=(XX1−12*XW2)/2 (i.e. a horizontal center) and vertically extended from a Y coordinate N1=(XY1−4*XH2) (i.e. a vertical center).

Figure 7D:
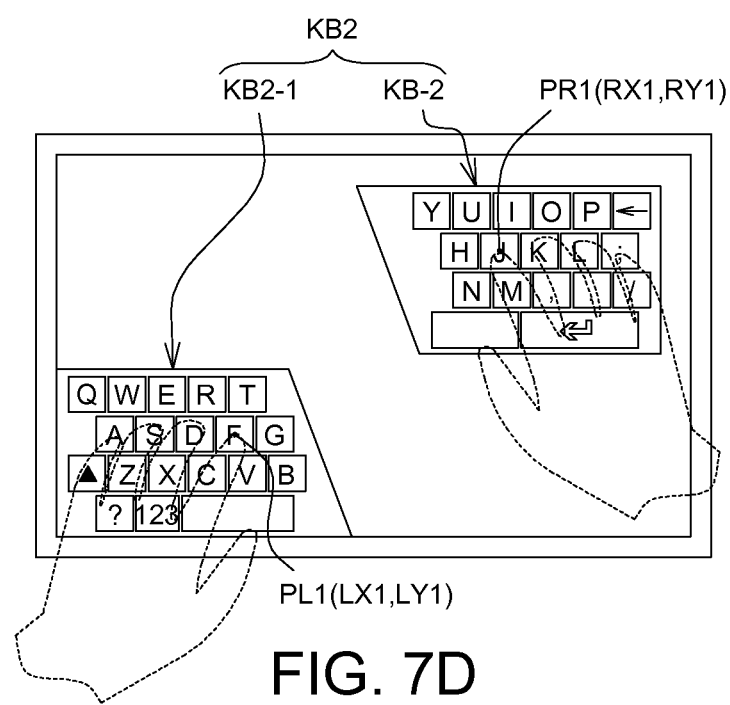

In Step S616, the processing module 210 extends the standard virtual keyboard into a split virtual keyboard based on the size of the unit key. The split virtual keyboard here refers to a virtual keyboard with keys divided into two parts, with a predetermined space separating one part from the other. For example, as shown in FIG. 7D, a split virtual keyboard KB2 includes a left keyboard Kb2-1 and a right keyboard KB2-2. The left keyboard KB2-1 is extended leftwards from the X coordinate LX1 of the left index finger touch point PL1 and downwards from the Y coordinate LY1 of the left index finger touch point PL1. The right keyboard KB2-2 is extended rightwards from the X coordinate RX1 of the right index finger touch point PR1 and upwards from the Y coordinate RY1 of the right index finger touch point PR1.

In Step S617, the processing module 210 adjusts the size of the unit key. In some embodiments, the processing module 210 adjusts the size of the unit key according to a size of the screen (e.g., the display panel 220 or the touch panel 230). For example, if XW2 (the unit key width) is greater than a threshold XX1/12 (one-twelfth of the screen width), XW2 may be adjusted to equal to XX1/12. If XH2 (the unit key height) is greater than a threshold XY1/4 (one-fourth of the height of the screen), XH2 may be adjusted to equal to XY1/4. Alternatively, based on key width-height ratios such as 1:1, 1:0.618, 1:1.618, or other golden ratios, one of XW2 and XH2 may be determined according to the other.

Figure 7E:
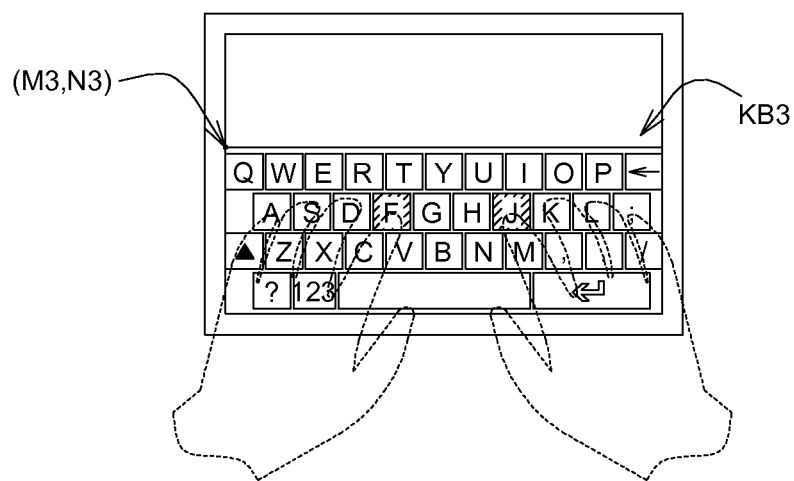

In Step S168, the processing module 210 extends the virtual keyboard based on the adjusted size of the unit key. For example, as shown in FIG. 7E, a virtual keyboard KB3 is extended from an X coordinate M3=0 and a Y coordinate N3=(XY1−4*XH2), where XH2 is the adjusted height of the unit key.

Therefore, through the coordinates and areas of the finger touch points, an adaptive virtual keyboard is provided so that the size and shape of the virtual keyboard match finger distances, fingertip sizes and/or typing gestures. The adaptive virtual keyboard satisfies different demands of individual users to optimize operation conveniences of an electronic device.

Again referring to FIG. 3, the trigger unit 213 treats the borders of the keys as reflection areas for piezoelectric haptic/tactile feedback, and provides piezoelectric haptic/tactile feedback in different strength intensities at positions where the borders of the keys and the symbols are presented. Thus, a user feels the borders of the keys and/or symbol(s) (such as alphabets and numbers) of the keys when touching the virtual keyboard, just like a sense of operating a physical keyboard.

Figure 8:
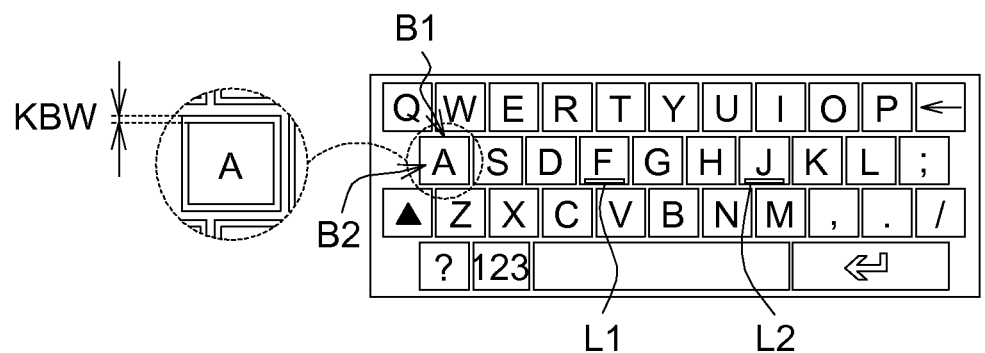
FIG. 8 is a schematic diagram of an example of a range for piezoelectric haptic/tactile feedback for a virtual keyboard.

Functions of the trigger unit 213 shall be described in detail below with reference to FIGS. 2 and 8. FIG. 8 shows a schematic diagram of a range of piezoelectric haptic/tactile feedback for the virtual keyboard.

In some embodiments, the processing module 210 controls the haptic/tactile actuator 240 to generate haptic/tactile feedback to express a border around each key of the virtual keyboard. Referring to FIG. 8, taking a key "A" for example, at a border B1 having a width KBW of two pixels, the haptic/tactile actuator 240 generates piezoelectric haptic/tactile. Thus, a user is allowed to feel the borders around the key "A" and other keys just like a feel of operating a physical keyboard.

In other embodiments, the processing module 210 controls the haptic/tactile actuator 240 to generate haptic/tactile feedback to express symbols of the keys of the virtual keyboard. For example, referring to FIG. 8, the haptic/tactile actuator 240 generates piezoelectric haptic/tactile in an alphabet range B2 in the key "A". Thus, a user is allowed to feel symbols of the key "A" and other keys just like a feel of operating a physical keyboard.

In some embodiments, the processing module 210 controls the haptic/tactile actuator 240 to generate haptic/tactile feedback to express a positioning line of a key. For example, as shown in FIG. 8, the haptic/tactile actuator 240 generates piezoelectric haptic/tactile feedback at a positioning line L1 in the key "F", and a positioning line L2 in the key "J" is generated similarly. Thus, a user is allowed to feel positioning lines of the virtual keyboard at the surface of the touch panel just like a feel of operating a physical keyboard.

Referring to FIG. 8, in some embodiments, to further simulate the sense of operating a physical keyboard, the amount of haptic/tactile for the borders of the keys may be greater than haptic/tactile for the alphabet ranges. In an exemplary embodiment, the amount of haptic/tactile feedback for the border B1 of the key "A" is about 50% of a maximum amount of haptic/tactile feedback; the amount of haptic/tactile feedback at the alphabet range B1 of the key "A" is about 10% of the maximum amount of haptic/tactile feedback.

Again referring to FIG. 3, the trigger unit 214 is triggered to generate vibration haptic/tactile feedback in response to a key press. Thus, a user is allowed to feel a sense of punching keys at the surface of the touch panel just like the sense of operating a physical keyboard.

In some embodiments, when the touch area of a finger touch point on the virtual keyboard is greater than a threshold, it is determined that the key corresponding to the finger touch point is pressed. For example, as shown in FIG. 5D, the touch area threshold for the finger touch point may be determined according to the touch areas A1 and A2. The touch area of a finger touch point resulted by a user pressing a key is generally larger than the touch area A1 indicating the touch panel is lightly touched. Therefore, in an exemplary embodiment, it is determined that a key corresponding to a finger touch point is pressed when the touch area of the finger touch point is larger than the touch area A1.

The method and the electronic device for providing a virtual keyboard according to the above embodiments of the present invention provide an adaptive virtual keyboard for a user, and haptic/tactile feedback for the virtual feedback is increased through the haptic/tactile actuator to optimize operation conveniences of the electronic device. In some embodiments, by multi-touch positioning, the key "F" and the key "J" of the virtual keyboard serve as positioning keys and also as basis for further constructing other keys. Therefore, the size and shape of the virtual keyboard may match user finger distances, fingertip sizes and/or typing gestures. By providing the haptic/tactile feedback, a user is allowed to feel the borders of keys of the virtual keyboard as well as the sense of punching the keys at the surface of the touch panel, just like the sense of operating a physical keyboard, thereby optimizing operation conveniences of a handheld device. Further, the haptic/tactile feedback also reduces visual reliance for a user to enhance user experiences.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A method for providing a virtual keyboard for an electronic device, comprising:
   controlling a touch panel to detect a plurality of finger touch points;
   in response to the finger touch points, controlling a display panel to display the virtual keyboard, a shape and a size of the virtual keyboard being determined according to at least coordinates and touch areas of the finger touch points;
   controlling a haptic/tactile actuator to generate haptic/tactile feedback to express a border around each key of the virtual keyboard; and
   controlling the haptic/tactile actuator to generate haptic/tactile feedback in response to a press upon a key of the virtual keyboard;
   wherein the size of the virtual keyboard is determined according to a distance between an index finger touch point and a little finger touch point.

2. The method according to claim 1, further comprising:
   controlling the touch panel to detect another plurality of finger touch points if a total number of the finger touch points does not satisfy a predetermined number.

3. The method according to claim 1, further comprising:
   controlling the touch panel to detect another plurality of finger touch points if a first distance between a left index finger touch point and a left little finger touch point overlaps a second distance between a right index finger touch point and a right little finger touch point.

4. The method according to claim 1, further comprising:
   calculating a first touch area of each of the finger touch points and calculating a second touch area of each of the finger touch points.

5. The method according to claim 1, wherein the size of the virtual keyboard is determined according to an average value of the touch areas of the finger touch points.

6. The method according to claim 1, further comprising:
   controlling the haptic/tactile actuator to generate haptic/tactile feedback to express symbol(s) of keys of the virtual keyboard.

7. The method according to claim 1, further comprising:
controlling the haptic/tactile actuator to generate haptic/tactile feedback to express a positioning line of one of the keys of the virtual keyboard.

8. An electronic device for haptic/tactile feedback, comprising:
a processing module;
a display panel, coupled to the processing module;
a touch panel, coupled to the processing module, and coupled to the display panel to form a touch display; and
a haptic/tactile actuator, coupled to the processing module;
wherein, the processing module controls the touch panel to detect a plurality of finger touch points on the touch panel; the processing module controls the display panel to display a virtual keyboard in response to the finger touch points, a size and a shape of the virtual keyboard being determined according to at least coordinates and touch areas of the finger touch points; the processing module controls the haptic/tactile actuator to generate haptic/tactile feedback to express a border around each key of the virtual keyboard; and the processing module controls the haptic/tactile actuator to generate haptic/tactile feedback in response to a press upon a key of the virtual keyboard;
wherein the sixe of the virtual keyboard is determined according to a distance between an index finger touch point and a little finger touch point.

9. The electronic device according to claim 8, wherein the processing module controls the touch panel to detect another plurality of finger touch points if the processing module determines a number of the finger touch points does not satisfy a predetermined number.

10. The electronic device according to claim 8, wherein the processing module controls the touch panel to detect another plurality of finger touch points when the processing module determines a first distance between a left index finger touch point and a left little finger touch point overlaps a second distance between a right index finger touch point and a right little finger touch point.

11. The electronic device according to claim 8, wherein the processing module calculates a first touch area of each of the finger touch points and calculates a second touch area of each of the finger touch points.

12. The electronic device according to claim 8, wherein the size of the virtual keyboard is determined according to an average value of the touch areas of the finger touch points.

13. The electronic device according to claim 8, wherein the processing module further controls the haptic/tactile actuator to generate haptic/tactile feedback to express symbol(s) of keys of the virtual keyboard.

14. The electronic device according to claim 8, wherein the processing module further controls the haptic/tactile actuator to generate haptic/tactile feedback to express a positioning line of one of the keys of the virtual keyboard.

15. A method for providing a virtual keyboard for an electronic device, comprising:
controlling a touch panel to detect a plurality of finger touch points;
in response to the finger touch points, controlling a display panel to display the virtual keyboard, a shape and a size of the virtual keyboard being determined according to at least coordinates and touch areas of the finger touch points;
controlling a haptic/tactile actuator to generate haptic/tactile feedback to express a border around each key of the virtual keyboard; and
controlling the haptic/tactile actuator to generate haptic/tactile feedback in response to a press upon a key of the virtual keyboard;
wherein the shape of the virtual keyboard is determined by a coordinate of a left index finger touch point and a coordinate of a right index finger touch point, and the virtual keyboard is provided as a split keyboard if a distance on a coordinate axis between the left index finger touch point and the right index finger touch point is greater than a threshold.

16. An electronic device for haptic/tactile feedback, comprising:
a processing module;
a display panel, coupled to the processing module;
a touch panel, coupled to the processing module, and coupled to the display panel to form a touch display; and
a haptic/tactile actuator, coupled to the processing module;
wherein, the processing module controls the touch panel to detect a plurality of finger touch points on the touch panel; the processing module controls the display panel to display a virtual keyboard in response to the finger touch points, a size and a shape of the virtual keyboard being determined according to at least coordinates and touch areas of the finger touch points; the processing module controls the haptic/tactile actuator to generate haptic/tactile feedback to express a border around each key of the virtual keyboard; and the processing module controls the haptic/tactile actuator to generate haptic/tactile feedback in response to a press upon a key of the virtual keyboard;
wherein the shape of the virtual keyboard is determined by a coordinate of a left index finger touch point and a coordinate of a right index finger touch point, and the virtual keyboard is provided as a split keyboard if the processing module determines a distance on a coordinate axis between the left index finger touch point and the right index finger touch point is greater than a threshold.

* * * * *